United States Patent
Justin (10) Patent No.: US 10,928,934 B1
(45) Date of Patent: Feb. 23, 2021

(54) ROCK AND SLIDE WIRELESS DONGLE

(71) Applicant: Dell Products L.P., Round Rock, TX (US)

(72) Inventor: Wong Hin Loong Justin, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/737,248

(22) Filed: Jan. 8, 2020

(51) Int. Cl.
G06F 3/0354 (2013.01)
G06F 3/039 (2013.01)
G06F 3/038 (2013.01)

(52) U.S. Cl.
CPC .......... *G06F 3/03543* (2013.01); *G06F 3/039* (2013.01); *G06F 3/0383* (2013.01)

(58) Field of Classification Search
CPC ..... G06F 3/03543; G06F 3/0383; G06F 3/039
See application file for complete search history.

(56) References Cited

U.S. PATENT DOCUMENTS

| | | | |
|---|---|---|---|
| 6,801,967 B2 | 10/2004 | Nakamura et al. | |
| 7,233,319 B2 | 6/2007 | Johnson et al. | |
| 8,212,774 B2 | 7/2012 | Eichenberger et al. | |
| 2007/0005844 A1* | 1/2007 | Lee | G06F 3/03543 710/62 |
| 2007/0132733 A1* | 6/2007 | Ram | G06F 3/03543 345/163 |
| 2013/0063353 A1* | 3/2013 | Liu | G06F 3/033 345/163 |
| 2017/0205879 A1* | 7/2017 | Joseph | G06F 3/0383 |

* cited by examiner

*Primary Examiner* — Kenneth B Lee, Jr.
(74) *Attorney, Agent, or Firm* — Zagorin Cave LLP; Robert W. Holland (57) ABSTRACT

An information handling system peripheral stores a wireless dongle in a cavity formed in the peripheral housing. The cavity has a head end with a width that accepts a head of the wireless dongle and a connector end with a width that accepts a connector of the wireless dongle and that is too narrow for the head of the wireless dongle to fit. When inserted into the cavity, the wireless dongle is removed by pressing on the connector with a finger to raise the head out of the cavity and in position to be grasped between the finger and a thumb. The wireless dongle pivots about a raised portion in the cavity with a greater depth at the connector end providing room for the downward press. A magnet disposed in the raised portion aids in retention of the wireless dongle.

20 Claims, 5 Drawing Sheets

ROCK AND SLIDE WIRELESS DONGLE

BACKGROUND OF THE INVENTION

Field of the Invention

The present invention relates in general to the field of information handling system wireless peripheral devices, and more particularly to an information handling system peripheral device having a rock and slide wireless dongle storage.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interface with end user's through peripheral devices, such as peripheral displays, keyboards and mice. Traditionally, peripheral devices communicated through cables that couple to ports of the information handling system, such as with the Universal Serial Bus (USB) protocol. Generally, information handling systems include one or more USB ports to support peripheral device communication. Desktop or other stationary information handling systems are typically setup with cabled peripherals that remain in place for extended time periods. A disadvantage of using cabled peripherals like this is that the cables tend to clutter the desktop area to become a nuisance to end users. Portable information handling systems also sometimes rely on cabled peripherals at a work or home station, such as by interfacing through a docking station. The use of cabled peripherals with a portable information handling system has the added annoyance that the cables are disconnected and reconnected each time the portable information handling system moves to a different location.

One convenient tool that simplifies peripheral device interfaces is the use of wireless personal area network (WPAN) peripheral devices, such as Bluetooth peripheral devices. Wireless peripherals typically rely upon public band wireless signals to communicate, such as 2.4 GHz. An advantage of wireless peripherals is their elimination of cables, which can considerably declutter a desktop space. Another advantage of wireless peripherals for portable information handling system is that an end user can take the peripheral with the information handling system for mobile use cases. Often, information handling systems integrate a WPAN transceiver to support interaction with wireless peripherals, such as a Bluetooth transceiver. In some situations, such integrated WPAN capability can be difficult to setup and use. For example, in a crowded location a large number of WPAN devices may be in use, which makes selection of a desired device more difficult from amongst many available devices. Typically, an advertisement button and connection LED indicator are used to establish an initial interface, after which the WPAN device often connects automatically based upon stored configuration information. Often end user's become confused during the configuration process, and, in some instances, frustrated if an unexpected peripheral interface is established. Another difficulty that can arise with use of integrated WPAN interfaces and standardized peripheral devices, such as Bluetooth compliant devices, is that end user inputs may be snooped and observed by third parties unless encryption is available and selected.

One alternative to integrated WPAN capability is interfacing the information handling system and peripheral with a detachable dongle that includes a wireless transceiver. As an example, a USB connector couples to a small plastic housing integrating a WPAN transceiver. The USB connector fits into a USB port of the information handling system, leaving the housing exposed to support wireless communications. The USB port provides power to the transceiver and communication of information between the transceiver and processing components of the information handling system, such as a keyboard controller that manages peripheral inputs for the information handling system. One advantage of such peripheral wireless interfaces is that they support wireless peripherals even where the information handling system lacks an integrated WPAN. Another advantage is that the dongle can be tied to a specific wireless peripheral so that the wireless interface is securely established without a confusing pairing process. A disadvantage of a dongle-supported wireless peripheral is that the dongles tend to be small and easily lost. Some wireless peripherals have an integrated dongle carrying space, such as a cavity formed on a bottom surface of the dongle into which the dongle fits. These integrated carrying spaces tend to be difficult to use as the dongle's small size makes grasping the dongle with fingers difficult. This difficulty is compounded in that the dongle typically snaps into the carrying space with a tight fit so that it will not easily fall out and be lost. Some dongle carrying spaces include a magnet to help secure the dongle in place by magnetic attraction, such as to adapt the carrying space to dongles of slightly different sizes. Magnetic force coupled with a tight snap connection tends to exacerbate end user difficulty in removing the dongle from the carrying space.

SUMMARY OF THE INVENTION

Therefore, a need has arisen for a system and method which stores wireless peripheral dongles in a wireless device housing to have ready release of the dongle to an end user.

In accordance with the present invention, a system and method are provided which substantially reduce the disadvantages and problems associated with previous methods and systems for storing a dongle in a wireless peripheral device. A wireless peripheral, such as a mouse, has a cavity sized to accept a wireless dongle in one orientation so that a connector of the wireless dongle is disposed over a depth sufficient to press down on the connector with a finger and raise the wireless dongle head out of the cavity. A raised portion in the cavity between the head and connector ends of the cavity acts as a pivot about which the head is raised out of the cavity.

More specifically, an information handling system processes information with a processor and memory disposed in a housing and interfaced with a port at the housing that communicates with external devices, such as Universal Serial Bus Port (USB) that accepts USB connectors. A wireless peripheral, such as a mouse or a keyboard, interfaces with a wireless dongle through wireless signals to communicate peripheral inputs, such as mouse pointing device pointing inputs or keyboard key inputs. The wireless dongle includes a connector that fits into the information handling system port, such as USB connector, and a head that integrates a radio to communicate with the peripheral. The wireless peripheral has a cavity formed in its housing to accept the wireless dongle in one orientation, such as with the head fitting into a head end of the cavity and the head having a width too great to fit in a connector end of the cavity. A raised portion between the head and connector ends of the cavity integrates a magnet to help hold the wireless dongle when stored in the cavity. The wireless dongle removes from the cavity by pressing on the connector with a finger to push the connector into the cavity and rock the head out of the cavity with a pivot about the raised portion so that the head of the wireless dongle is exposed for a grasp by the finger and a thumb.

The present invention provides a number of important technical advantages. One example of an important technical advantage is that a wireless dongle securely stores in a wireless peripheral housing cavity when not in use. The wireless dongle removes from the cavity through a press on a connector of the dongle towards a bottom depth of the cavity at the connector end, resulting in a pivot about the raised portion to lift the wireless dongle head out of the cavity and exposed for a grasp by a thumb of the hand whose finger pressed down on the connector. Lifting the wireless dongle head out of the cavity provides an end user with ready grasp of the wireless dongle without having to pry underneath and into the cavity. The rocking motion to lift the wireless dongle head also helps to overcome magnetic attraction from a magnet integrated in a raised portion that helps to secure the wireless dongle in place, and which would make removal with a prying process difficult in the presence of the magnetic attraction.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system peripheral device stores a wireless dongle in a cavity having a depth at a connector end so that a press on the connector into the cavity lifts the wireless dongle head out of the cavity and available to an end user grasp. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
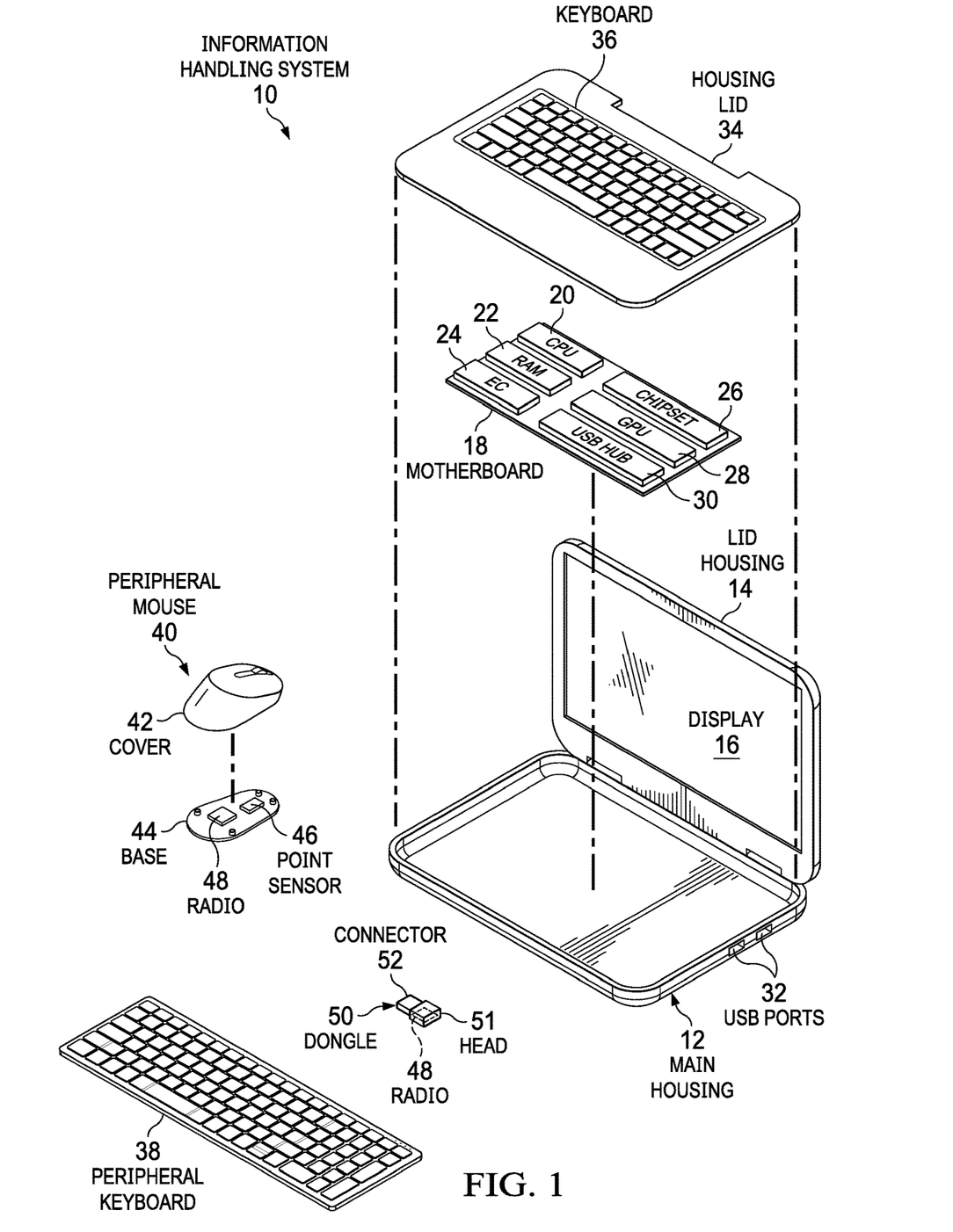
FIG. 1 depicts an exploded view of an information handling system configured to interact with wireless peripheral devices through a wireless dongle.

Referring now to FIG. 1, an exploded view depicts an information handling system 10 configured to interact with wireless peripheral devices 38 and 40 through a wireless dongle 50. In the example embodiment, information handling system 10 has a clamshell portable configuration with a main housing 12 rotationally coupled to a lid housing 14 which holds a display 16 in a raised position. Main housing 12 has a housing cover 34 with an integrated keyboard 36 so that inputs at portable information handling system 10 may be performed with lid housing 14 open to expose keyboard 36 and display 16. Main housing cover 34 may integrate additional input devices, such as a touchpad or pointing stick, so that an end user can make inputs from the integrated input devices while the system is mobile. Main housing 12 contains a motherboard 18 disposed in its interior that interfaces processing components that cooperate to process information. In the example embodiment, a central processing unit (CPU) 20 executes instruction to process information, such as operating system and application instructions stored in a random access memory (RAM) 22. A chipset 26 manages CPU 20 operations, such as clock speed and information accesses. A graphics processor unit (GPU) 28 processes information to generate pixel values that are presented at display 16. An embedded controller, also sometimes referred to as a keyboard controller, manages physical device operations, such as power supply, thermal conditions and interactions with input/output (I/O) devices. A Universal Serial Bus (USB) hub 30 supports communications with external devices through the USB protocol, such as through USB ports 32 exposed at the surface of main housing 12. The example embodiment depicts a portable information handling system with example processing components, however, in alternative embodiments other types of configurations may be used, such as desktop or server information handling systems and different configurations of processing components.

Integrated I/O devices of a portable information handling system are sometimes awkward to use, so end users often interact with portable information handling systems through wireless peripheral devices, such as a wireless peripheral mouse 40 and/or a wireless peripheral keyboard 38. Wireless peripheral devices allow an end user to make inputs without a cable connection by communicating the inputs from the wireless peripheral to the information handling system through wireless signals, such as with Bluetooth or other wireless protocols. One example peripheral device is mouse 40, which accepts end user inputs from movements detected by a point sensor 46 as a base 44 moves along a surface with end user grasp at a cover 42. A radio 48 interfaced with point sensor 46 transmits the point inputs to information handling system 10 as wireless signals. Another example peripheral device is a peripheral keyboard 38, which accepts key inputs and transmits the key inputs to information handling system 10 as wireless signals. In alternative embodiments, other types of peripheral input devices may be used.

In the example embodiment, a wireless dongle 50 supports wireless communication between wireless peripherals 38 and 40 and information handling system 10. Wireless dongle 50 integrates a radio 48 in a head 51 that interfaces with a connector 52 to communicate through a port of information handling system 10, such as USB ports 32. For example, wireless signals for pointing information or key inputs is transmitted from radio 48 in peripheral mouse 40 to radio 48 in dongle 50 and then communicated through connector 52 to USB ports 32 for use as inputs at CPU 20, such as with management by embedded controller 24. When peripherals 38 and 40 are not in use, an end user can remove dongle 50 from USB port 32 and store it so that, at the next use of peripherals 38 and 40, the end user may plug in dongle 50 to again support wireless peripheral interactions. One difficulty with this approach is that wireless dongle 50 is small and easily lost. If wireless dongle 50 becomes lost, wireless peripherals 38 and 40 can become essentially unusable.

Figure 2A:
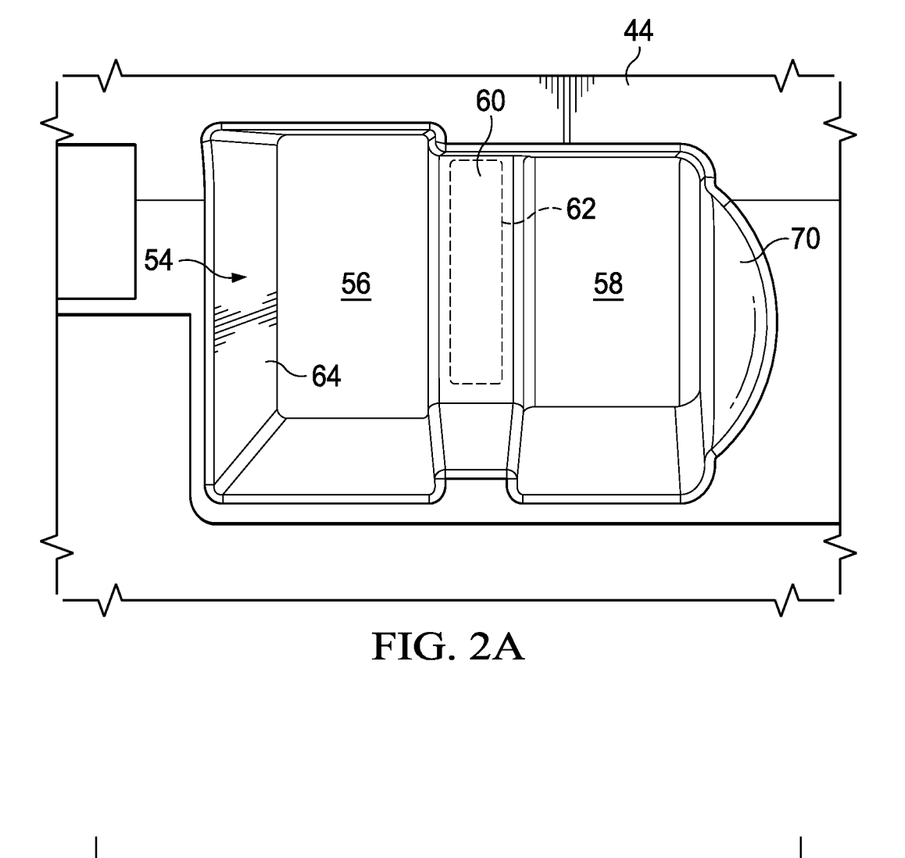
FIGS. 2A and 2B depicts a wireless dongle storage cavity integrated in a wireless peripheral housing.
Figure 2B:
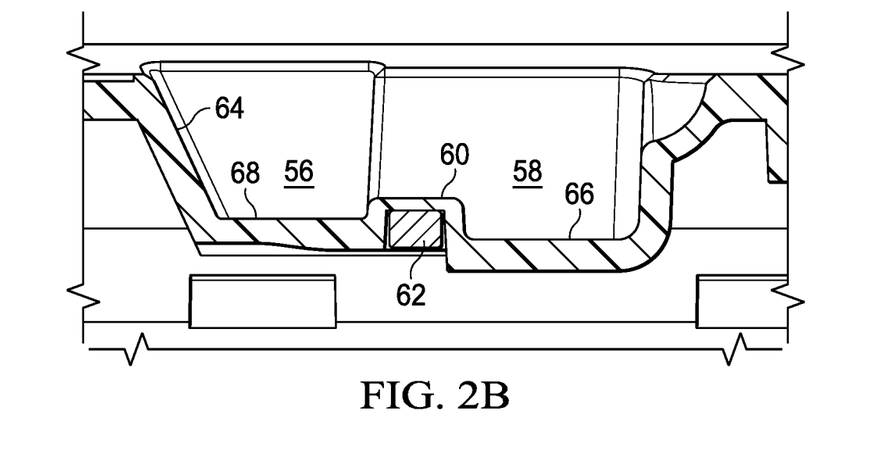

Referring now to FIGS. 2A and 2B, a wireless dongle storage cavity 54 is depicted integrated in a wireless peripheral housing base 44, such as at the bottom surface of wireless peripheral mouse 40. FIG. 2A depicts a bottom view of cavity 54 formed, for example, as a feature with a mold used to manufacture base 44 through hard plastic injection molding. Cavity 54 has a head end 56 having a width sufficient to accept a wireless dongle 50 head 51 and a connector end 58 sized with a width to accept wireless dongle 50 connector 52 and too narrow to accept head 51. The widths of head end 56 and connector end 58 help to ensure that wireless dongle 50 fits within cavity 54 in only one orientation. Between head end 56 and connector end 58, a raised portion 60 is disposed having a neodymium magnet 62 disposed within raised portion 60. A finger guide 70 is formed to fit a finger place in it for aiding removal of a wireless dongle 50 as explained in greater detail below. FIG. 2B depicts a side cutaway view of cavity 54 with magnet 62 integrated in raised portion 60. In the example embodiment, magnet 62 is glued in place with an adhesive and raised portion 60 has a relatively thin thickness of 0.6 to 0.8 mm to minimize the distance between magnet 62 and ferromagnetic material included in connector 52 and wireless dongle 50. In the example embodiment, a connector depth 66 at connector end 58 of cavity 54 has a greater depth than a head depth 68 at head end 56 of cavity 54. A sloped wall 64 formed at head end 56 ramps up and out from head depth 68 to aid in guiding a wireless dongle 50 out of cavity 54, as described in greater depth below. As illustrated in FIG. 2B, finger guide 70 provides a small depth to give room to press down on a connector 52 so that an end user finger has room to press connector 52 to the bottom of connector depth 66.

Figure 3:
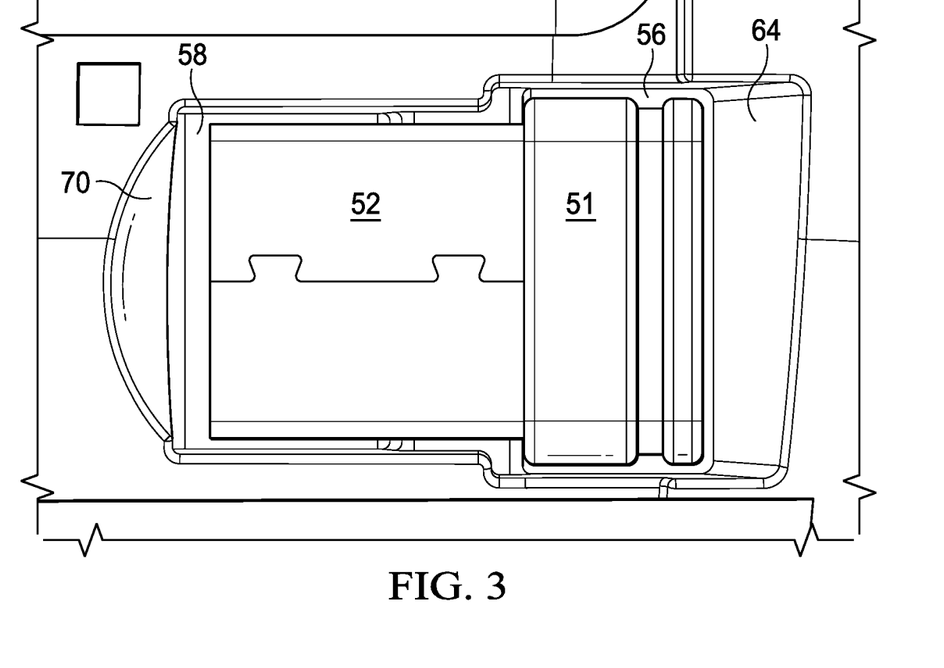
FIG. 3 depicts an example embodiment of a wireless dongle stored in a cavity formed in a wireless peripheral housing.

Referring now to FIG. 3, an example embodiment depicts a wireless dongle 50 stored in a cavity 54 formed in a wireless peripheral housing. Wireless dongle 50 fits in only one orientation due to the relative widths of the dongle head 51 and connector 52 to the cavity 54 head end 56 and connector 58. Finger guide 70 at the end of connector 52 provides space for a finger press down on connector 52, which works head 51 upwards out of cavity 54 and against sloped wall 64. In the example embodiment, multiple sizes of head 51 might be accommodated with a slightly wider head end 56, such as may be needed to interchange cavity 54 across plural different types of peripherals and wireless dongles 50. In such a situation, secure attachment of wireless dongle 50 in cavity 54 is ensured with magnetic attraction and, where necessary, a snap type fitting on connector 52, which has a universal size.

Figure 4:
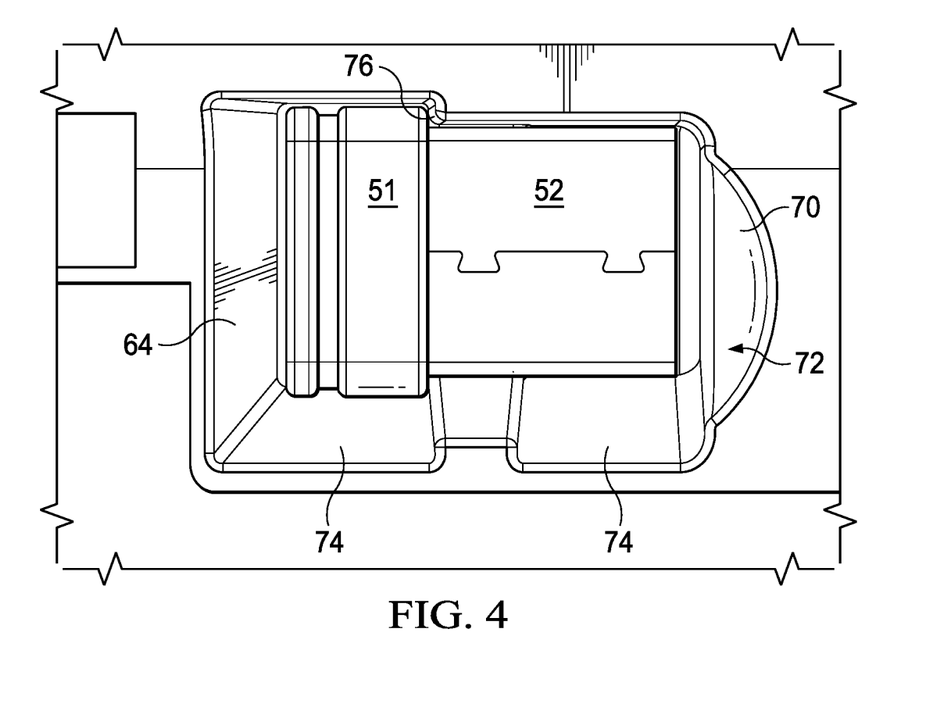
FIG. 4 depicts an alternative example embodiment of a wireless dongle stored in a cavity formed in a wireless peripheral housing.

Referring now to FIG. 4, an alternative example embodiment depicts a wireless dongle 50 stored in a cavity 54 formed in a wireless peripheral housing. In the example embodiment, side walls 74 along one side surface have a slope that helps to address manufacture steps, such as undercuts related to molding direction. Within cavity 54, an orientation feature 72 is formed that helps to guide installation of wireless dongle 50 in a desired orientation. In the example embodiment, a snap feature 76 is included in orientation feature 72 to compress around connector 52 at installation to aid holding wireless dongle 50 in cavity 54.

Figure 5A:
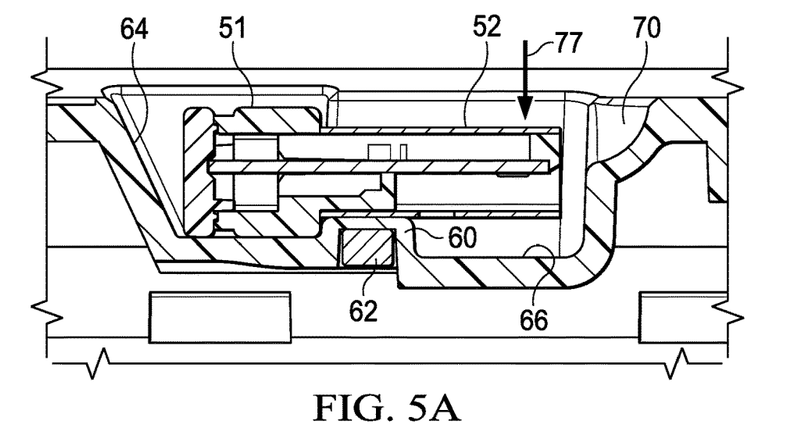
FIGS. 5A, 5B and 5C depict a side cutaway view of a wireless dongle removal from its wireless peripheral storage cavity.
Figure 5B:
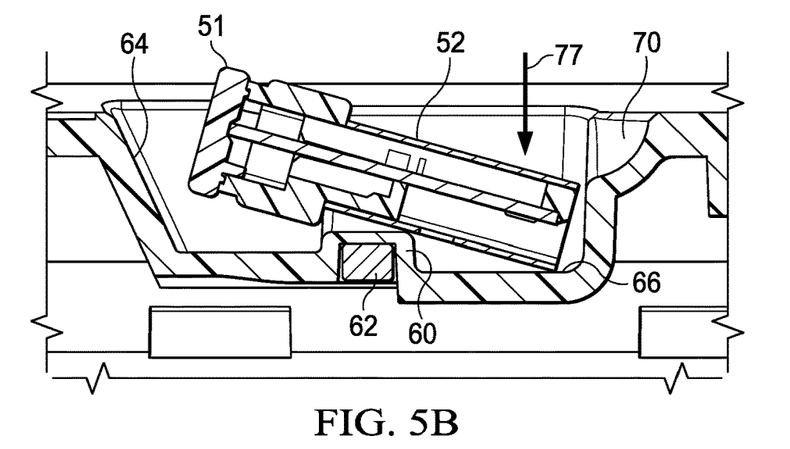
Figure 5C:
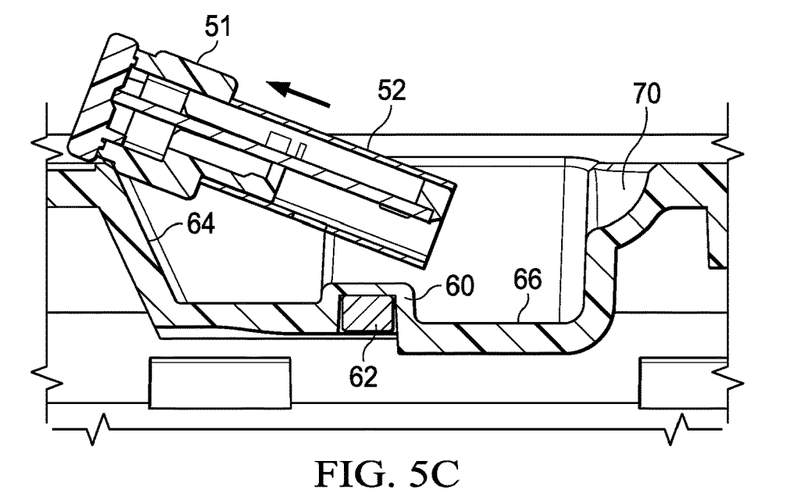

Referring now to FIGS. 5A, 5B and 5C, a side cutaway view depicts a wireless dongle removal from its wireless peripheral storage cavity. FIG. 5A depicts wireless dongle 50 installed in cavity 54 with head 51 resting against the bottom of head end 56 and connector 52 resting on raised portion 60. In contrast, due to the greater depth at connector end 58 and the support of raised potion 60, connector 52 in connector end 58 rests raised over the bottom surface of connector end 58. Magnet 62 is disposed in close proximity to connector 52 to bias wireless dongle 50 within cavity 54. Finger guide 70 provides space between the end of cavity 54 at connector end 58 to direct a finger press by an end user at the end of connector 52. FIG. 5B depicts an end user press as indicated by arrow 77 at connector 52 to push connector 52 to the bottom of connector end 58. Downward movement of connector 52 pivots the bottom surface of connector 52 at raised portion 60, thus pressing head 51 against sloped wall 64 to work up and out of cavity 54. FIG. 5C depicts wireless dongle 50 pressed against sloped wall 64 and out of cavity 54, such as by a finger that presses down at finger guide 70 to drive connector 52 back towards sloped wall 64.

Figure 6A:
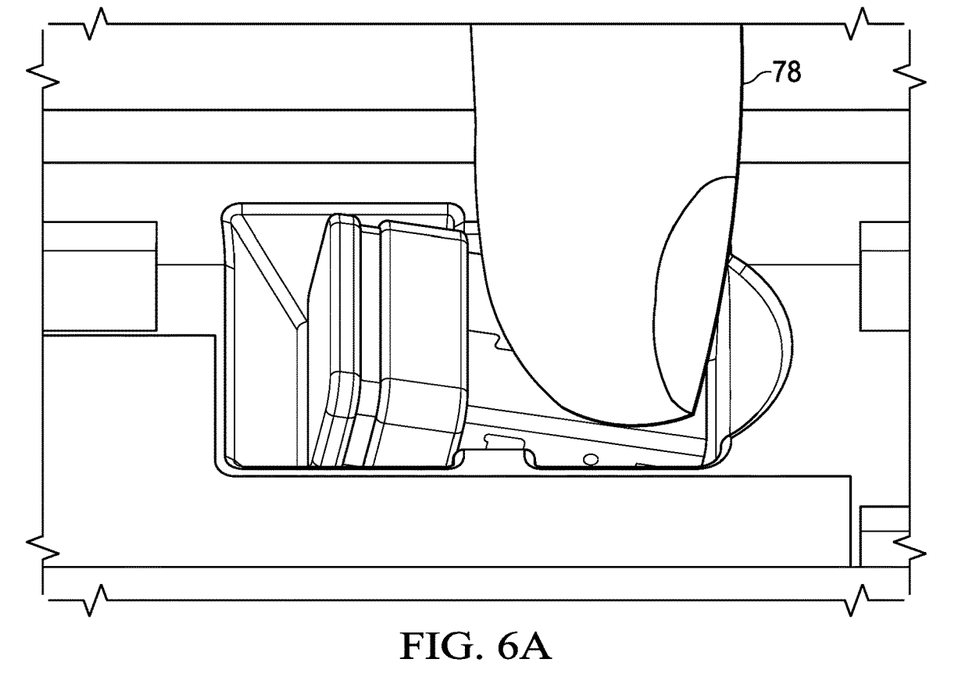
FIGS. 6A and 6B depict end user finger interactions with a wireless dongle at removal from a wireless peripheral storage cavity.
Figure 6B:
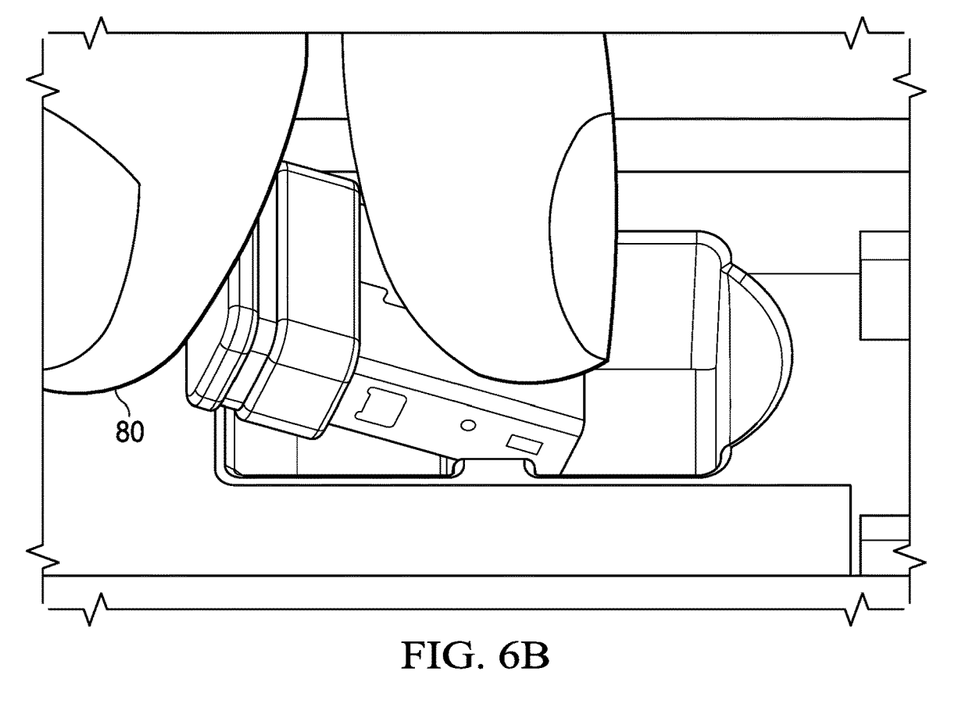

Referring now to FIGS. 6A and 6B end user finger interactions with a wireless dongle 50 are depicted at removal from a wireless peripheral storage cavity 54. FIG. 6A illustrates a downward push by a finger 78 at finger guide 70 to pivot connector 52 at raised portion 60, producing a rocking motion that raises head 51 out of cavity 54. FIG. 6B depicts that continued pressing by finger 78 works head 51 against sloped wall 64 so that head 51 becomes accessible by a thumb 80 of the same hand as finger 78 to grasp head 51 and lift wireless dongle 50 out of cavity 54.

Although the present invention has been described in detail, it should be understood that various changes, substitutions and alterations can be made hereto without departing from the spirit and scope of the invention as defined by the appended claims.

What is claimed is:

1. A wireless peripheral comprising:
a peripheral housing having a surface and a cavity;
one or more input devices disposed in the peripheral housing and operable to accept end user inputs;
a peripheral radio disposed in the peripheral housing and interfaced with the one or more input devices, the peripheral radio operable to communicate end user inputs as wireless signals; and
a wireless dongle separate from the peripheral housing, the wireless dongle having a connector at one end and a head at an opposing end, the connector configured to interface with an information handling system port to receive power and to communicate information, the head having a dongle radio operable to receive wireless signals of the peripheral radio and communicate information associated with the wireless signals to the information handling system through the connector;
wherein the cavity has a connector end and a head end, the connector end having a width to accept the wireless dongle connector, the width too narrow to accept the wireless dongle head, the head end having a width sized to accept the wireless dongle head, the cavity having a greater depth at the connector end than the head end, the connector end depth sufficient that pressing on the wireless dongle connector to the connector end depth exposes the wireless dongle head outside of the cavity.

2. The wireless peripheral of claim 1 wherein the cavity head end surface slopes outward from the head end depth to the peripheral housing surface to guide the wireless dongle head out of the cavity when the connector presses towards the connector end depth.

3. The wireless peripheral of claim 2 further comprising a raised member formed in the cavity between the head end and the connector end, the wireless dongle pivoting at the raised member when the connector presses toward the connector end to expose the head outside of the cavity.

4. The wireless peripheral of claim 3 further comprising a magnet integrated in the raised member, the magnet attracting the connector into the cavity.

5. The wireless peripheral of claim 4 wherein the one or more input devices comprises a mouse.

6. The wireless peripheral of claim 4 wherein the one or more input devices comprises keyboard keys.

7. The wireless peripheral of claim 4 wherein the wireless dongle connector comprises a Universal Serial Bus connector.

8. The wireless peripheral of claim 4 further comprising a finger access feature formed at the connector end of the cavity.

9. The wireless peripheral of claim 4 further comprising a snap feature disposed proximate the cavity and sized to engage against wireless dongle when disposed in the cavity.

10. A method for removing a wireless dongle from a wireless peripheral cavity, the method comprising:
pressing a connector end of the wireless dongle into the cavity with a finger of one hand;
in response to the pressing, pivoting the wireless dongle about a raised member disposed in the cavity to raise a head end of the wireless dongle out of the cavity; and
grasping the head end of the dongle between the finger and a thumb of the one hand.

11. The method of claim 10 further comprising:
integrating a magnet in the raised member; and
biasing the connector into the cavity with the magnet.

12. The method of claim 11 further comprising:
in response to the pressing, engaging the wireless dongle head against a sloped cavity wall at the head side of the cavity; and
guiding the dongle head out of the cavity with the sloped cavity wall.

13. The method of claim 12 wherein:
the wireless dongle head has a first width;
the wireless dongle connector has a second width of less than the first width;
the cavity has a head end that accepts the wireless dongle head of at least the width and a connector end that accepts the wireless dongle connector of less than the first width to prevent insertion of the wireless dongle head into the connector end.

14. The method of claim 13 wherein the wireless peripheral is a mouse that provides pointing inputs to an information handling system with wireless signals communicated to the wireless dongle.

15. The method of claim 13 wherein the wireless peripheral is a keyboard that provides key inputs to an information handling system with wireless signals communicated to the wireless dongle.

16. The method of claim 13 wherein the cavity defines a finger insertion area at the connector end to provide space for the finger pressing the connector.

17. The method of claim 13 wherein the connector is a Universal Serial Bus connector.

18. An information handling system comprising:
a housing;
a processor integrated in the housing and operable to execute instructions to process information;
a memory integrated in the housing and interfaced with the processor, the memory operable to store the instructions and information;
a port disposed in the housing and interfaced with the processor, the port operable to accept a connector to communicate information between the processor and a peripheral associated with the connector;
a mouse peripheral separate from the housing, the mouse peripheral having a mouse housing, a pointing sensor disposed in the mouse housing, a radio disposed in the mouse housing and interfaced with the pointing sensor to communicate pointing information by wireless signals, the mouse housing a cavity formed in a bottom surface, the cavity having a head end, a connector end, and a raised portion disposed between the head end and the connector end, the head end having a head depth and head width, the connector end having a connector depth and a connector width; and
a wireless dongle having a head and connector, the head having a radio to communicate the pointing information with the mouse peripheral radio as wireless signals, the radio interfaced with the connector to communicate the pointing information through the port to the processor, the wireless dongle head having a width of less than the cavity head width and more than the cavity connector width to fit in the cavity in only one orientation, the cavity connector depth providing space below the connector when inserted in the cavity so that a press on the connector pivots the wireless dongle at the raised portion to lift the head out of the cavity.

19. The information handling system of claim 18 further comprising a magnet integrated in the raised portion to bias the connector into the cavity.

20. The information handling system of claim 19 wherein the connector and port are Universal Serial Bus compliant.

* * * * *